United States Patent
Ercoli et al.

[15] 3,694,471
[45] Sept. 26, 1972

[54] 17-VALERATE ESTER OF 6α,9α-DIFLUOROHYDROCORTISONE, ITS COMPOSITIONS AND USE AS AN ANTI-INFLAMMATORY AGENT

[72] Inventors: Alberto Ercoli, Milan; Rinaldo Gardi, Carate Brianza, both of Italy

[73] Assignee: Warner-Lambert Pharmaceutical Company, Morris Plains, N.J.

[22] Filed: June 8, 1970

[21] Appl. No.: 44,574

Related U.S. Application Data

[63] Continuation-in-part of Ser. No. 707,934, Feb. 26, 1968, abandoned.

[52] U.S. Cl. ............................. 260/397.45, 424/243
[51] Int. Cl. ............................................ C07c 169/34
[58] Field of Search ......./Machine Searched Steroids

[56] References Cited

UNITED STATES PATENTS

| | | | |
|---|---|---|---|
| 2,838,499 | 6/1958 | Spero et al. | 260/239.55 |
| 3,152,154 | 10/1964 | Ercoli et al. | 260/397.45 |
| 3,297,729 | 1/1967 | Mancini et al. | 260/397.4 |
| 3,312,590 | 4/1967 | Elks et al. | 167/58 |
| 3,383,394 | 5/1968 | Weber et al. | 260/397.45 |

*Primary Examiner*—Henry A. French
*Attorney*—Albert H. Graddis, Henry E. Millson, Jr., Frank S. Chow, Neil D. Edwards and Anne M. Kelly

[57] ABSTRACT

There has been prepared the new 6α,9α-difluorohydrocortisone 17-valerate useful as an anti-inflammatory agent. This compound may be incorporated in a topically suitable pharmaceutical carrier to obtain pharmaceutical compositions which may be administered locally as ointments, creams or lotions for the treatment of inflammatory conditions.

1 Claim, No Drawings

17-VALERATE ESTER OF 6α,9α-DIFLUOROHYDROCORTISONE, ITS COMPOSITIONS AND USE AS AN ANTI-INFLAMMATORY AGENT

This application is a continuation-in-part of application Ser. No. 707,934, filed on Feb. 26, 1968 and now abandoned.

This invention relates to a new and useful steroid compound having enhanced anti-inflammatory activity. The invention also relates to pharmaceutical compositions containing this compound as well as to those compositions particularly adapted for the topical treatment of inflammatory conditions and diseases.

The new steroid compound of this invention is the 17-valerate of 6α,9α-difluorohydrocortisone or 6α,9α-difluoro-11β,17α,21-trihydroxy-pregn-4-en-3,20-dione 17-valerate, represented by the following structural formula:

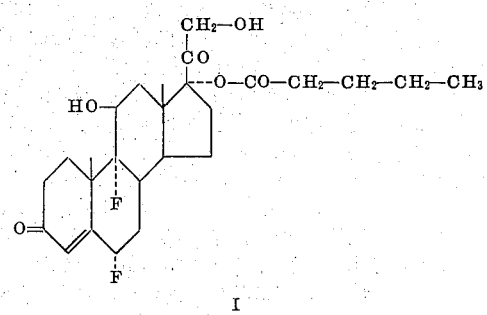

I

This compound shows anti-inflammatory properties particularly high in comparison with those of the known 6α,9α-difluorohydrocortisone or its 21-esters. It is also unexpectedly more active than the previously known 17-esters of potent corticosteroids having the prednisolone structure. Prednisolone is recognized to be more potent than hydrocortisone and it is known that the introduction of a 16-methyl substituent in combination with a 9α-fluoro group produces a further increase in the anti-inflammatory activity of the parent compound. The new steroid 17-ester of this invention which is unsubstituted at the 16-position and which lacks the characteristic $\Delta^{1,4}$-diene structure exhibits an anti-inflammatory activity several times greater than that of 17-ester analogs of 16-methyl substituted 9α-fluoroprednisolone.

On account of its particular properties, the compound of the present invention is useful for the treatment of inflammatory conditions and diseases, particularly when administered by topical application.

The compositions of this invention contain the active steroid in intimate admixture with a suitable carrier or excipient and may be in solid, semisolid, liquid or viscous form. The active ingredient may be compounded, for example, with the usual carriers for tablets, pellets, suppositories, powders, ointments, lotions, creams, emulsions, aqueous suspensions and other forms particularly suitable for topical use. The carriers employed are those which have already been proposed for use in manufacturing preparations for topical use, such as for example fats of animal origin and vegetable oils, saturated or unsaturated fatty acids, aluminum stearate, alcohols, polyalcohols, such as for example glycerol, propylene or polyethylene glycols, waxes, aliphatic hydrocarbons or lanolin, together with comparatively high quantities of water. Other carriers which can be used are hydrophilic bases, cholesterol, vaseline, vaseline oil, silicones which are physiologically inert, sodium alginate and in addition stabilizing, thickening and coloring agents and perfumes. The compositions of the present invention can also contain preservative or bacteriostatic agents such as for example esters of p-hydroxy benzoic acid, i.e. methyl-, ethyl- or propyl-p-hydroxy benzoate, mercuric derivatives such as for example the merthiolate, or quaternary ammonium derivatives such as for example cetyl-trimethyl-ammonium bromide, which besides the surface active action possess a good bacteriostatic activity.

Other active ingredients compatible with the new steroid of this invention, such as for example antibiotics, local anesthetics or sulphonamides can also be incorporated in the topical anti-inflammatory compositions if these added properties or characteristics are desired.

The 17-valerate ester of 6α,9α-difluorohydrocortisone is included in the compositions of this invention in an amount sufficient to produce the desired therapeutic effect upon the inflammatory process or condition. Advantageously the compositions will contain the active ingredient in an amount of from 0.0005 to 5 percent and preferably from 0.005 to 0.5 percent by weight.

The compositions of this invention are indicated for the treatment of dermatitides of various type, psoriasis and allergic conditions which respond to the topical application of anti-inflammatory steroids.

The 17-valerate of 6α,9α-difluorohydrocortisone is prepared by treatment of the corresponding diol with a lower alkyl orthovalerate in the presence of an acid catalyst followed by acid hydrolysis of the resulting 17α,21-orthovalerate according to the following scheme:

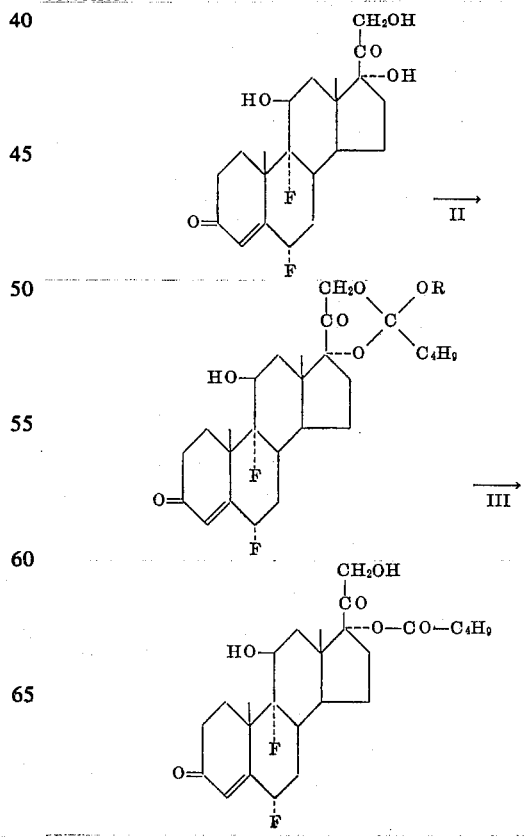

wherein R represents a lower alkyl, preferably methyl.

The orthoesterification step is carried out at a temperature ranging from 60° to 130°C and preferably around 100°–110°C for a period of 8–24 hours, whereby the 17α,21-orthovalerate of Formula III forms as a mixture of two epimeric orthoesters. The orthovalerate thus obtained is then hydrolysed with a mineral or organic acid to give the 17-monovalerate I.

In order further to illustrate this invention, the following examples are given.

EXAMPLE 1

A mixture of 1 g of 6α,9α-difluorohydrocortisone, 3 cc of methyl orthovalerate and 10 mg of paratoluenesulfonic acid in 5 cc of dimethylformamide is maintained overnight under nitrogen stream at 105°C (bath temperature). Then there are added a few drops of pyridine and the solvent is evaporated under vacuum. The residue is taken up with little methanol, filtered and the product crystallized from a methanol-methylene chloride mixture. The 17α,21-(1'-methoxy)-n-pentylidenedioxy-6α,9α-difluoro-Δ⁴-pregnen-11β-ol-3,20-dione is so obtained; M.P. 179°–183°C, $[\alpha]_D^{22} = +70.5°$ (dioxane, c=0.5 percent).

A suspension of 1 g of this product in 10 cc of methanol is treated with 0.5 cc of an aqueous solution of oxalic acid and heated on water-bath at 40°–50°C. When the product is completely passed into solution, the mixture is concentrated under vacuum. The residue is then shaken with water, the insoluble product is filtered off and then dried. The 6α,9α-difluorohydrocortisone 17-valerate is thus obtained which, when crystallized from acetone-ether, melts at 186°–190°C, $[\alpha]_D^{22} = +31° \pm 2°$ (dioxane, c = 0.5 percent). Yield: 75 percent.

EXAMPLE 2

Anti-inflammatory activity

The 17α-valerate of 6α,9α-difluorohydrocortisone was evaluated for its local antiphlogistic effect and for its systemic action in comparison with betamethasone 17-valerate, the compound which is recognized as one of the most topically active anti-inflammatory agents with a low systemic effect.

For this evaluation, the recently developed ear irritant test of Tonelli, L. Thibault and I. Ringler (Endocrinology, 77, 625, 1965) was used in order to determine not only the anti-inflammatory potency but also the degree of absorption of the steroid through its effect on thymus weight. The test was performed on Wistar or Sprague-Dawley rats of both sexes weighing about 60 g. The right ears of the rats were treated with a phlogistic agent consisting of 4 parts pyridine, 1 part distilled water, 5 parts diethyl ether and 10 parts 4 percent croton oil in diethyl ether (v/v). Control rats were treated with the above vehicle, topically applied to both sides of the right external ear via curved, felt tipped forceps, until the ear surfaces appeared uniformly moist. Test animals were treated with the same vehicle in which different amounts of the two steroids under examination were dissolved. Six hours later, when the phlogistic response to croton oil was maximal, each animal was lightly etherized and both ears were removed and individually weighed on a torsion balance. The antiphlogistic effect of the test steroid was expressed by the decrease in weight of the right ear. Forty-eight hours after topical application of the materials, the animals were sacrificed and the thymi were removed and weighed on a torsion balance. The weight of the thymus was taken as an index of the systemic effect of the compound.

The results obtained in two replicate tests are reported in Table I below.

TABLE I

| Compound | Steriod conc., mg./ml. vehicle | Right ear weight * (mg.) | | Thymus weight * (mg.) | |
|---|---|---|---|---|---|
| | | 1° assay | 2° assay | 1° assay | 2° assay |
| Control | | 134.0±5.5 | 127.2±3.63 | 136.8±9.3 | 220.5±10.9 |
| Betamethasone 17-valerate | 0.05 | 121.2±4.5 | 125.7±6.46 | 121.8±4.5 | 197.2±7.4 |
| | 0.25 | 127.1±4.7 | 122.3±5.00 | 136.2±12.3 | 152.7±9.9 |
| | 1.25 | 118.3±6.1 | 116.9±4.79 | 94.1±9.0 | 111.5±3.7 |
| 6α, 9α-difluorohydrocortisone 17-valerate | 0.05 | 97.2±3.4 | 109.2±2.96 | 129.5±9.5 | 208.7±12.4 |
| | 0.25 | 90.3±5.0 | 90.9±3.46 | 129.6±14.5 | 202.9±8.3 |
| | 1.25 | 82.6±2.6 | 86.5±3.19 | 75.8±8.1 | 131.0±6.0 |

* Average ± standard error.

These results show that the 17-valerate of 6α,9α-difluorohydrocortisone exhibits a local antiphlogistic activity at least 25 times greater than betamethasone 17-valerate (the low dose of the former being more effective than the high dose of the latter), while the systemic thymolytic effects of the two compounds are practically equivalent.

EXAMPLE 3

An ointment having the following composition is prepared for external use following accepted pharmaceutical compounding procedures:

| Components | Percent By Weight |
|---|---|
| 6α,9α-difluorohydrocortisone 17-valerate | 0.05 |
| Cetyl alcohol | 0.50 |
| Anhydrous lanolin | 5.00 |
| Distilled water | 5.00 |
| Benzyl alcohol | 0.50 |
| Liquid paraffin | 20.00 |
| White soft paraffin | 68.95 |

Melt the cetyl and benzyl alcohols, the liquid paraffin and the white soft paraffin at 75°C, add the active ingredient, then the lanolin previously mixed with the water. Refine twice.

EXAMPLE 4

Cream having the following composition:

| Components | Percent By Weight |
|---|---|
| 6α,9α-difluorohydrocortisone 17-valerate | 0.025 |
| Propylparaben | 0.015 |

| | |
|---|---|
| Methylparaben | 0.025 |
| Cetyl trimethylammonium bromide | 1.000 |
| Propylene glycol | 12.000 |
| Stearyl alcohol | 15.000 |
| White soft paraffin | 12.775 |
| Liquid paraffin | 22.500 |
| Distilled water | 36.660 |

Melt the stearyl alcohol, the white soft paraffin and the liquid paraffin at 75°C, add a solution of the active ingredient in the propylene glycol, then the other ingredients previously mixed with the water and warmed to 75°C. Refine twice.

EXAMPLE 5

Ointment having the following composition:

| Components | Percent By Weight |
|---|---|
| 6α,9α-difluorohydrocortisone 17-valerate | 0.20 |
| Lanolin | 14.45 |
| Liquid paraffin | 17.75 |
| Neomycin sulphate | 0.40 |
| White soft paraffin | 67.20 |

Add the 6α,9α-difluorohydrocortisone 17-valerate and the neomycin sulphate to the other ingredients previously melted at 75°C and refine twice.

In place or besides the neomycin sulphate other topically active antibiotics can be used, such as colistin sulphate, bacitracin, gramicidin, chloramphenicol or the sulphonamides.

EXAMPLE 6

Lotion having the following composition:

| Components | Percent By Weight |
|---|---|
| 6α,9α-difluorohydrocortisone 17-valerate | 0.4 |
| Ethyl alcohol 95° | 40.0 |
| Water | 59.0 |
| Cologne water | 0.6 |

The active product is added to a clear mixture of the other ingredients.

EXAMPLE 7

Lotion having the following composition:

| Components | Percent By Weight |
|---|---|
| 6α,9α-difluorohydrocortisone 17-valerate | 0.05 |
| Ethyl alcohol 95° | 40.00 |
| Glycerol | 10.00 |
| Propylene glycol | 30.00 |
| Distilled water | 19.95 |

Dissolve the active product in the alcohol and add to a clear mixture of the other ingredients.

We claim:
1. 6α,9α-Difluorohydrocortisone 17-valerate.

* * * * *